United States Patent
Uchiumi et al.

(10) Patent No.: US 7,599,616 B2
(45) Date of Patent: Oct. 6, 2009

(54) IMAGE SHOOTING APPARATUS, DISPLAY APPARATUS AND IMAGE SHOOTING AND DISPLAY APPARATUS

(75) Inventors: Tadashi Uchiumi, Urayasu (JP); Toshio Nomura, Hachioji (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 529 days.

(21) Appl. No.: 11/239,258

(22) Filed: Sep. 30, 2005

(65) Prior Publication Data

US 2007/0077056 A1      Apr. 5, 2007

(51) Int. Cl.
*G03B 35/00* (2006.01)
(52) U.S. Cl. ...................... 396/324; 396/326
(58) Field of Classification Search ......... 396/324–334; 348/36–39, 42, 46–48, 51, 220.1; 359/462, 359/725; 352/69
See application file for complete search history.

(56) References Cited

U.S. PATENT DOCUMENTS 5,786,847 A * 7/1998 Katayama et al. ............. 348/47

2006/0008268 A1 * 1/2006 Suwa ........................ 396/310

FOREIGN PATENT DOCUMENTS

| JP | H08-317425 | 11/1996 |
| JP | 10-079884 | 3/1998 |
| JP | 11-084491 | 3/1999 |
| JP | 11-355624 | 12/1999 |

OTHER PUBLICATIONS

2D/3D Switchable Displays, Jacobs, et al., Sharp Technical Report, Apr. 2003.

* cited by examiner

*Primary Examiner*—Bot LeDynh
(74) *Attorney, Agent, or Firm*—Birch, Stewart, Kolasch & Birch, LLP

(57) ABSTRACT

An image shooting and display apparatus includes: a plurality of image pickup portions. An image pickup controller switches image pickup portions to be used in accordance with the image shooting mode. It also switches the image shooting mode in accordance with the image pickup portions to be actuated in accordance with the usage condition of the apparatus. A mode switching controller switches shooting mode and display mode, and controls image pickup portions suitable for each mode by way of the image pickup controller and also controls an image display portion.

12 Claims, 7 Drawing Sheets

Stereoscopic image

Panorama image

Plural scene image

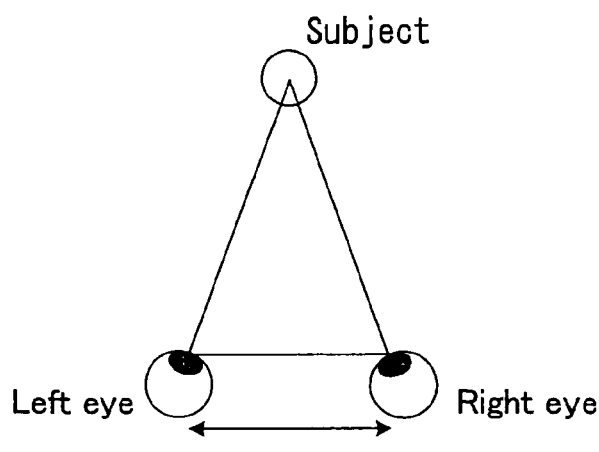
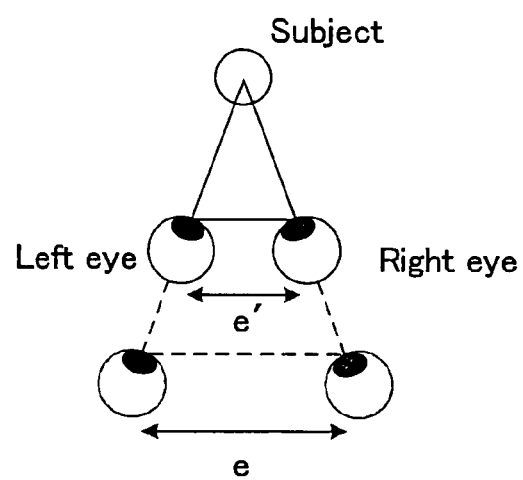
FIG. 7A
Image shooting in conformity with actual field of vision
FIG. 7B
Image shooting in focus with a close subject

IMAGE SHOOTING APPARATUS, DISPLAY APPARATUS AND IMAGE SHOOTING AND DISPLAY APPARATUS

BACKGROUND OF THE INVENTION (1) Field of the Invention

The present invention relates to an image shooting apparatus for stereoscopic images using a plurality of image pickup means, a display apparatus capable of stereoscopic display and an image shooting and display apparatus capable of shooting and displaying stereoscopic images.

(2) Description of the Prior Art

Conventionally, camera apparatus having two image pickup means for shooting and recording stereoscopic images have been proposed. For example, a patent literature 1 (Japanese Patent Application Laid-open Hei 8 No. 317425) has disclosed an electronic camera which shoots an identical subject by two image pickup means arranged side by side in the horizontal direction of the camera body and records the left and right image information to thereby realize the shooting and recording of a stereoscopic still picture. Further, this electronic camera has a mode select switch between a normal mode and a stereoscopic shooting mode so that it can effect both the normal shooting and stereoscopic shooting by switching the image pickup means driven in link with the operation of the switch.

In the case of shooting a stereoscopic image as in the above prior art, the two image pickup means are generally arranged apart as much as the distance between human eyes. This is done because it becomes possible to obtain a natural stereoscopic image by shooting images similar to the human field of vision. Further, the two image pickup means are also generally arranged in the horizontal direction of the shooting apparatus as described in the prior art, in conformity with the human field of vision.

The electronic camera of the above prior art is aimed at shooting still pictures but the above configuration is not limited to still pictures but can also be applied to motion pictures. That is, it is possible to provide an electronic camera which can shoot stereoscopic motion pictures in addition to still pictures, by application of the above prior art.

In order to view the captured stereoscopic images, a display means capable of displaying stereoscopic images is needed. For this purpose, for example a display device described in a non-patent literature 1 ("2D/3D Switchable Display" written by Jacobs, et al. in Sharp Technical Report April, 2003) may be used. When the above electronic camera includes such a display device, the captured stereoscopic image can be viewed on the spot.

Generally, the mean distance between human eyes is 65 mm. Accordingly, if a pair of image pickup means are attempted to be arranged in the horizontal direction of a camera as in the prior art electronic camera, it is naturally necessary to provide a housing with as much width. In practice, since the image pickup means have their own thickness and the housing structure also has its own thickness, the apparatus is not feasible if it does not have a width broader than 65 mm.

On the other hand, recent popular, so-called digital cameras have become miniaturized, so there are many products that do not have the above width. In particular, in the category of apparatus of the types that can shoot motion pictures as well as still pictures, many kinds of so-called movie cameras of one-hand grip style have been found on the market. In many cases, the cameras of this kind have as much a body width as the lens size of the image pickup means. Accordingly, the prior art arrangement of a pair of image pickup means side by side in the horizontal direction is not always a suitable manner to realize a stereoscopic image shooting function.

This problem is not limited to digital cameras. The recent miniaturization and high-performance trend of image pickup devices and microprocessors make it popular for hand-held type telephones such as cellular phones and PHS, or information terminals such as PDAs, to incorporate an image capturing function of still pictures and motion pictures, and it has come to a point where these hand-held type telephones or information terminals are able to be used in the same manner as digital cameras. However, if a stereoscopic image shooting function is attempted to be provided for these devices, it is difficult to secure a sufficient distance for laying out two image pickup means in the horizontal direction of the device as in the case described with the digital cameras. In particular, a cellular phone generally has a vertically long configuration for convenience of use as a telephone, so it is difficult to arrange two image pickup means in the horizontal direction of the device.

Further, there is also another inherent problem due to cellular phones. That is, the display portion for displaying images also tends to be vertically long similarly to the cellular phone's device configuration, hence the display is not necessarily suitable as a stereoscopic display means for creating a stereoscopic effect by use of the parallax of left- and right-eyes.

The above prior art enables stereoscopic shooting by inclusion of two image pickup means. Other than stereoscopic shooting, use of a plurality of image pickup means also enables panorama shooting mode in which output images from a plurality of image pickup means are joined to form a large-sized continuous image and plural shooting mode in which as many different scenes as the number of the image pickup means are captured at the same time. However, the above prior art does not make reference to any configuration which enables both the stereoscopic shooting made and these various shooting modes.

SUMMARY OF THE INVENTION

The present invention has been achieved in view of the problems described above, it is therefore the first object of the present invention to provide an image shooting and display apparatus which facilities vertically long appliances such as cellular phones, needless to say horizontally long appliances such as normal digital cameras, to implement shooting and display of stereoscopic images.

It is the second object of the present invention to provide a display apparatus, regardless of its configuration, enables display of various types of image data in an effective manner without the necessity of complicated operations by the user.

It is the third object of the present invention to provide a shooting apparatus capable of making smooth switch and control of various shooting modes that can be enabled by inclusion of a plurality of image pickup means as well as to provide an image shooting and display apparatus having a display means capable of displaying normal images and stereoscopic images and capable of making smooth switch and control of the various display modes.

In order to achieve the above object, the image shooting apparatus, display apparatus and image shooting and display apparatus of the present invention are configured as follows:

In accordance with the first aspect of the present invention,

An image shooting apparatus of the present invention includes: a plurality of image pickup means which can be controlled to be individually active or inactive; an image pickup control means for controlling the plurality of image pickup means; and a mode switching control means for performing switching control between a plurality of image shooting modes in accordance with an operating status of the image pickup means, and is characterized in that among the plurality of image pickup means, at least one image pickup means is variable in distance from the other image pickup means.

The image shooting apparatus is characterized in that the mode switching control means sets the shooting mode of the apparatus into a normal shooting mode when, among the plurality of image pickup means, only a single image pickup means is operated for image shooting.

The image shooting apparatus is also characterized in that the mode switching control means switches the image shooting mode of the apparatus into stereoscopic shooting mode when among the plurality of image pickup means, at least two image pickup means, arranged a predetermined distance apart from each other, or set a predetermined distance apart from each other by shifting at least one of the plurality of image pickup means, are actuated in such a state that optical axes of the image pickup means lie on the same plane and the optical axes are parallel to each other or intersect each other at a point on that plane forwards with respect to these image pickup means.

Further, the image shooting apparatus is characterized in that the mode switching control means switches the image shooting mode of the apparatus into panorama shooting mode when among the plurality of image pickup means, at least two image pickup means are actuated in such a state that optical axes of the image pickup means lie on the same plane and the optical axes intersect each other at a point on that plane rearwards with respect to these image pickup means.

The image shooting apparatus is characterized in that the mode switching control means switches the image shooting mode of the apparatus into plural scene shooting mode when among the plurality of image pickup means, at least two image pickup means are actuated in such a state that optical axes of the image pickup means do not exist within the same plane.

The image shooting apparatus is configured so that among the plurality of image pickup means, at least two image pickup means are arranged a predetermined distance apart from each other along a longitudinal direction of the image shooting apparatus, or that at least one image pickup means is variable in distance from the other image pickup means.

A display apparatus of the present invention includes: an image display means capable of displaying at least a stereoscopic image other than a normal image; and a display mode switching control means for implementing switching control between a plurality of display modes provided for the image display means, and is characterized in that the display mode switching control means judges a format of image data to be displayed and determines the display mode of the display means.

Also, the display apparatus of the present invention further includes: a display mode selecting means for determining an image display mode in accordance with a usage condition of the apparatus, and is characterized in that the display mode selecting means determines a direction of the image to be displayed in accordance with the usage condition of the apparatus.

The display apparatus of the present invention is characterized in that when the user has given instructions, the display mode selecting means determines the direction of the image to be displayed following the user instructions.

The display apparatus is characterized in that the display mode switching control means includes a means for controlling the display area of the image to be displayed and modifies a display size of the image to be displayed so that it fits within the display area of the display means.

Further, the display apparatus of the present invention is characterized in that when the entire image does not fit within a display area of the display means, the display mode switching control means can scroll part of the image to be displayed in accordance with user's instructions when the user has given the instructions.

An image shooting and display apparatus of the present invention includes: a plurality of image pickup means which can be controlled to be individually active or inactive; an image pickup control means for controlling the plurality of image pickup means; a mode switching control means for performing switching control between a plurality of image shooting modes in accordance with operating status of the image pickup means; and a display means capable of displaying both a normal image and a stereoscopic image, and is characterized in that the mode switching control means determines a display mode of the display means in accordance with the image shooting mode.

As provided with the above means, the image shooting apparatus, display apparatus and image shooting and display apparatus of the present invention bring about advantages as follows.

That is, according to the image shooting apparatus of the present invention, it is possible to capture the plurality of shots of images at the same time without being affected by constraints of the apparatus shape. In particular, two image pickup means arranged a predetermined distance apart from each other or spaced with an arbitrary distance from each other, may be used to capture stereoscopic images.

According to the display apparatus of the present invention, with regard to display of images, it is possible to take advantage of the apparatus configuration and obtain effective display of stereoscopic images as well as panorama images, plural scene images, etc.

Further, according to the image shooting and display apparatus of the present invention, it is possible to obtain various types of image data such as stereoscopic images, panorama images, plural scene images, from the image data captured by the plurality of image pickup means, and it is also possible to switch the shooting mode and display mode of the data without the necessity of complicated operations by the user.

BRIEF DESCRIPTION OF THE DRAWINGS

FIGS. 7A and 7B are conceptual views showing the relationship between the distance from the eyes to a subject when a stereoscopic image is viewed and the distance between two image pickup portions (eyes).

DESCRIPTION OF THE PREFERRED EMBODIMENTS

Embodiments of the present invention will hereinafter be described. Here in this specification, mere description of an "image" not accompanied by "still" or "motion" indicates either the still picture or motion picture, or both.

Description of the First Embodiment

To begin with, the first embodiment of the present invention will be described with reference to FIGS. 1 to 3 and FIG. 7.

Figure 1:
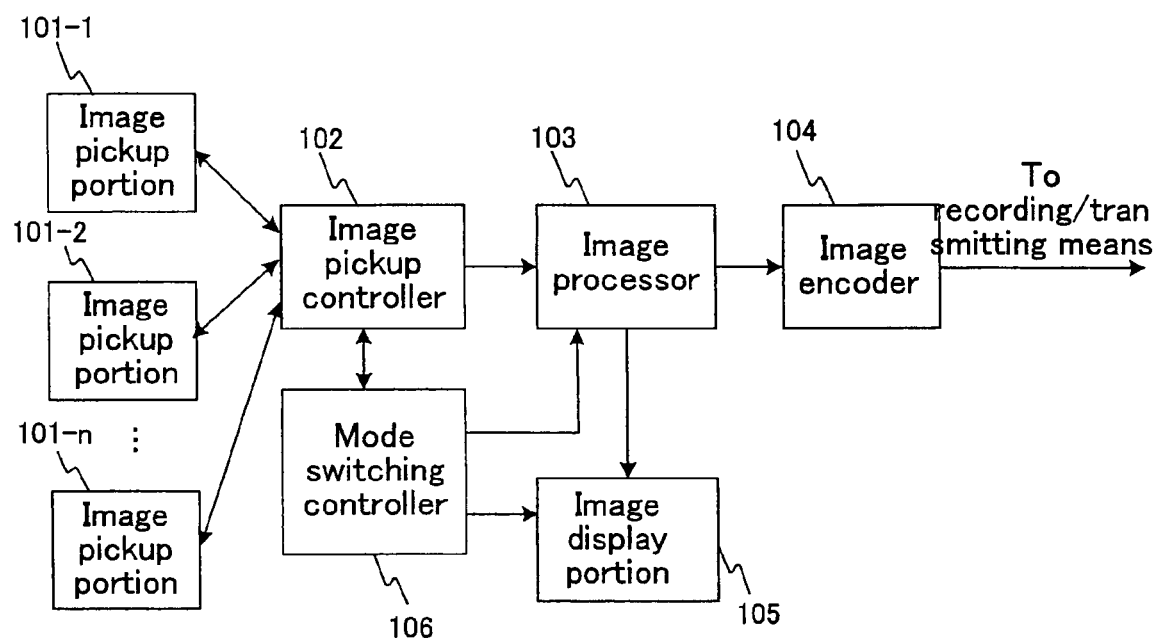
FIG. 1 is a block diagram showing the internal configuration of an image shooting and display apparatus according to the first embodiment of the present invention.

FIG. 1 is a block diagram showing the internal configuration of an image shooting and display apparatus according to the first embodiment of the present invention.

As shown in FIG. 1, the image shooting and display apparatus of the present invention includes: a plurality of image pickup portions 101-1 to 101-n; an image pickup controller 102; an image processor 103; an image encoder 104; and image display portion 105; and a mode switching controller 106.

The plurality of image pickup portions 101-1 to 101-n are each formed of a lens, a photoelectric transducer, etc., to capture image data from optically input information. Image pickup controller 102 makes status management and operation control of the plurality of image pickup portions 101-1 to 101-n and outputs the image data from each of the image pickup portions to image processor 103 and notifies the status of each image pickup portion to mode switching controller 106. Image processor 103 subjects the image data supplied from each of the image pickup portions to various image processes such as correction in characteristic difference between the image pickup portions, composition, recognition and the like to create image data for display and encoding. At the same time it also creates information indicating the format of the image data. Information for implementation of image processing, such as the number of input images and the image shooting conditions at each image pickup portion and the like, is obtained from the aftermentioned mode switching controller 106. Image encoder 104 implements coding of the image data having been processed by the image processor 103 so that it can be recorded or transmitted. Further, this encoder acquires the information on the image data format from image processor 103 and sends out it together with the coded image data to recording/transmitting means. Concerning the encoding, any scheme can be used without regard of one for still pictures and that for motion pictures. Image display portion 105 includes a display device capable of displaying stereoscopic images as well as normal flat image, as disclosed in the aforementioned non-patent literature 1 "2D/3D switchable display" stated in the prior art, for example, and displays the image data having been processed by image processor 103 in a suitable display mode. Mode switching controller 106 acquires the status information on each of the image pickup portions from image pickup controller 102 and determines one of the shooting modes such as normal shooting, stereoscopic shooting, panorama shooting, plural scene shooting and the like and the display mode corresponding to the determined shooting mode. The thus determined shooting and display modes are notified to image pickup controller 102, image processor 103 and image display portion 105.

Next, the operations of this image shooting and display apparatus in different shooting modes will be described.

The normal shooting mode is a shooting mode in which image data is captured using a single image pickup portion only. Whether normal shooting mode is actuated can be determined based on mode switching controller 106's perception of the operating status of image pickup portions 101-1 to 101-n by image pickup controller 102 or by the user's operation through an unillustrated control means. The operational status of each image pickup portion can be known based on whether the image pickup portion's cover which is provided individually is open or closed, the direction of each image pickup portion, or the like. In the case where the mode of image shooting is determined based on the operational status of the image pickup portions, if only a single image pickup portion is operating, the status can be determined to be the normal shooting mode.

In normal shooting mode, image data captured by a single image pickup portion is corrected as required by image processor 103, then transferred to image encoder 104 and image display portion 105. Image display portion 105 implements display in normal display mode because it is for a normal flat image. There is of course a case where no display is needed upon image shooting. In this case, image display portion 105 does not make any display.

The stereoscopic shooting mode is a shooting mode in which, of the plurality of image pickup portions, at least two are used to create image data. Whether stereoscopic shooting mode is actuated can be determined, similarly to the aforementioned normal shooting mode, based on the operating status of the image pickup portions or by the user's operation. In the case where the mode of image shooting is determined based on the operational status of the image pickup portions, if two or more image pickup portions spaced a predetermined distance apart are operating, if the directions of image taking or the optical axes of these image pickup portions lie on the same plane and these optical axes are parallel to each other or intersect each other at a point on that plane forwards with respect to these image pickup portions, the status can be determined to be the stereoscopic shooting mode.

In stereoscopic shooting mode, the image data captured by at least two image pickup portions of the plurality of image pickup portions is corrected as required by image processor 103 and then transferred to image encoder 104 and image display portion 105. Image display portion 105 implements display in stereoscopic display mode because it is for stereoscopic image. Alternatively, since some users are not good at shooting while viewing stereoscopic display, display may be given in normal display mode. Other than these, image display portion 105 does not need to make display, similarly to the above normal shooting mode.

Figure 2A:
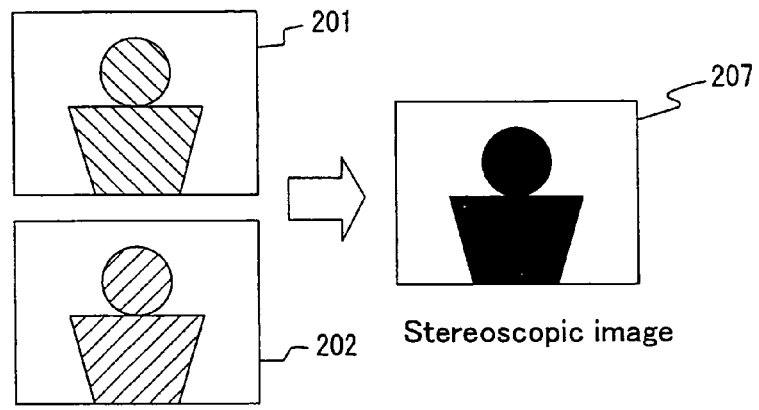
FIGS. 2A to 2C are conceptual views showing the structures of image data in different shooting and display modes.

FIG. 2A is a conceptual view showing the structure of image data taken in this stereoscopic shooting mode. A stereoscopic image 207 is constituted based on an image 201 shot by one image pickup portion and an image 202 shot by another image pick up portion. The images 201 and 202 are image data of an identical subject taken in different directions, one of them constituting the left-eye view of the stereoscopic image, the other the right-eye view.

A stereoscopic image is not limited to being constituted of a pair of images for the left-eye and right-eye views only, but may be constituted of a plurality of images taken of an identical subject from different viewpoints. This enables reproduction of an image depending on the viewer's position, and hence can provide a more natural stereoscopic image. In this case, more than two image pickup portions should be operated in this stereoscopic shooting mode.

Panorama shooting mode is a mode in which image data is captured by using two or more image pickup portions. Whether panorama shooting mode is actuated can be determined, similarly to the aforementioned shooting modes, based on the operating status of the image pickup portions or by the user's operation. In the case where the mode of image shooting is determined based on the operational status of the image pickup portions, if the directions of image taking or the optical axes of two or more image pickup portions lie on the same plane and these optical axes intersect each other at a point on that plane rearwards with respect to these image pickup portions, the status can be determined to be the panorama shooting mode.

In panorama shooting mode, the image data captured by the plurality of image pickup portions is corrected and composited as required by the image processor and then transferred to the image encoder and image display portion. The image display portion displays the composited image. Alternatively, the image display portion does not need to make display, similarly to the above normal shooting mode.

Figure 2B:
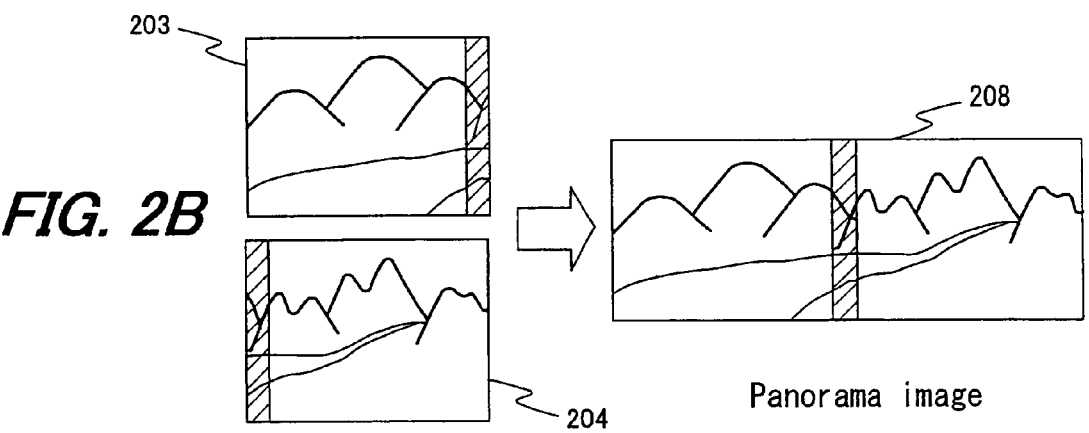

FIG. 2B is a conceptual view showing the structure of image data taken in this panorama shooting mode. A panorama image 208 is constituted of an image 203 shot by one image pickup portion and an image 204 shot by another image pickup portion. The images 203 and 204 are images that include an overlap area, forming a continuous scene. The hatched portions are the overlap area between two images. In order to connect these hatched portions smoothly and continuously, the image processor performs recognition, correction and composition of the images. Though for simplicity FIG. 2B shows an example where the panorama is formed of images shot by two image pickup portions, it is also possible to obtain a panorama image composed of three or more shot images based on the same idea.

Plural scene shooting mode is a mode in which image data is captured by using two or more image pickup portions. Whether plural scene shooting mode is actuated can be determined, similarly to the aforementioned shooting modes, based on the operating status of the image pickup portions or by the user's operation. In the case where the mode of image shooting is determined based on the operating status of the image pickup portions, if two or more image pickup portions are operating in a state other than the aforementioned modes, that is, when all the optical axes of the operating image pickup portions do not lie in the same plane, the status can be determined to be the plural scene shooting mode.

In this shooting mode, the image data captured by the plurality of image pickup portions is corrected as required by image processor 103 and then transferred to image encoder 104 and image display portion 105. Image display portion 105 implements display of the images from all the image pickup portions by partitioning the display area. Alternatively, image display portion 105 does not need to make display, similarly to the above normal shooting mode. Further, in image encoder 104, the plurality of images may be encoded separately or may be encoded as an integrated single image.

Figure 2C:
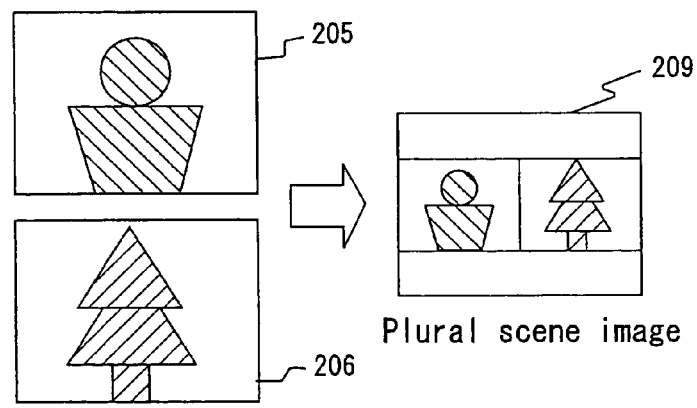

FIG. 2C is a conceptual view showing the structure of image data taken in this plural view shooting mode. In this image shooting mode, an image 205 shot by one image pickup portion and an image 206 shot by another image pickup portion are independent, having no relationship with each other. These images integrated into a plural-view image 209 are displayed simultaneously on one display portion. Size reduction and correction for display are implemented by the image processor 103 or image display portion 105. Though FIG. 2C shows an example where the images are arranged horizontally, the images may be arranged vertically or may be displayed using sub-windows. Though an example including the images shot by two image pickup portion is shown for simplicity, a plural scene image composed of three or more image shots can be obtained based on the same idea.

Next, description will be made of the arrangement of image pickup portions in the image shooting and display apparatus according to the present embodiment.

Figure 3A:
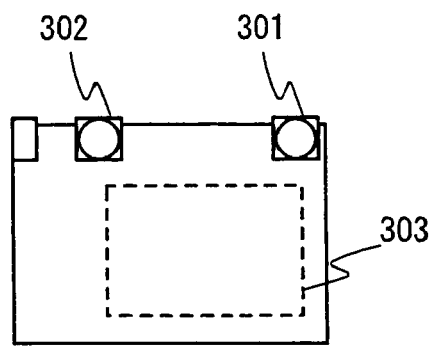
FIGS. 3A to 3C are schematic external views showing image shooting and display apparatus according to the first embodiment of the present invention.
Figure 3B:
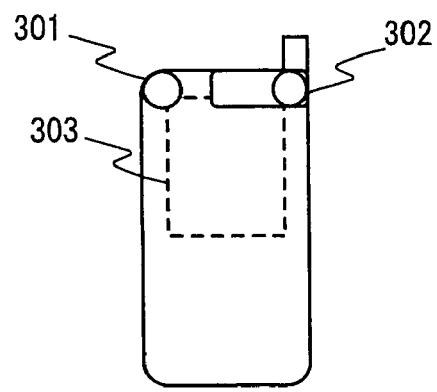
Figure 3C:
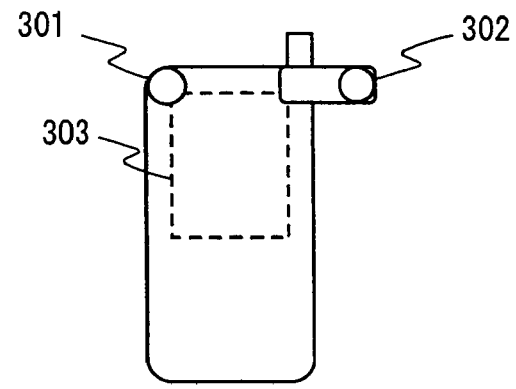

FIGS. 3A to 3C are schematic external views showing image shooting and display apparatus having a plurality of image pickup portions. In these figures, examples of image shooting and display apparatus including two image pickup portions are shown, where a main image pickup portion 301, an auxiliary image pickup portion 302 and a display portion 303 are provided. FIGS. 3A to 3C are front views from the side of the subject to be shot. That is, these apparatus have the image pickup portions arranged on the front side and display portion 303 on the rear side. FIG. 3A shows an example of a laterally long image shooting and display apparatus, found in a typical digital camera or the like. FIG. 3B shows an example of a vertically long image shooting and display apparatus, found as a typical cellular phone or the like.

In both the configurations of FIG. 3A and FIG. 3B, two image pickup portions are disposed a predetermined distance apart at the same level in the horizontal direction. In the configuration of FIG. 3A, the apparatus has a sufficient width in the horizontal direction, and the two image pickup portions are set spaced with the distance between human eyes. In the configuration of FIG. 3B, the two image pickup portions are spaced with a distance shorter than the distance between human eyes because the apparatus is not wide enough in the horizontal direction thereof. To make up for this, one image pickup portion 302 is constructed to be movable as shown in FIG. 3C, so that it can be made apart from the other image pickup portion 301 as required. Further, in order to enable panorama shooting and plural scene shooting, at least one of the image pickup portions has an adjustable structure of the direction of shooting or the direction of the optical axis, so that the plurality of image pickup portions are able to shoot not only an identical subject but also shoot continuous scenes and different objects from each other.

In the image shooting and display apparatus of the present embodiment, either main image pickup portion 301 or auxiliary image pickup portion 302 is used for shooting normal still pictures and normal moving pictures, whereas both the image pickup portions are used for stereoscopic shooting, panorama shooting and plural scene shooting. Alternatively, it is also possible to use main image pickup portion 301 alone to shoot normal still pictures and moving pictures. In this case, actuation of only the main image pickup portion 301 at all times regardless of capture of still pictures or moving pictures is sufficient, so that user operation and control can be simplified.

Referring now to FIGS. 7A and 7B, the relationship between the distance between image pickup portions (called base length) and the distance from the image pickup portions to the subject during stereoscopic shooting will be described. The subject as in FIGS. 7A and 7B is one that should be a standard image however in an actual case some other objects may exist in the foreground and background. FIG. 7A shows an example where two image pickup portions are disposed so that the base length at stereoscopic shooting is in agreement with the distance e between human eyes. That is, this configuration is to shoot a stereoscopic image in conformity with human's actual field of view, and when viewing the captured stereoscopic image, the viewer is able to view a natural stereoscopic image while perceiving the actual distance from the image pickup portion or the viewer to the subject. On the other hand, FIG. 7B shows an example where two image pickup portions are disposed so that the base length e' at stereoscopic shooting is shorter than the distance e between human eyes. There occur some cases where the distance from the camera to the subject is too close and if the subject is shot with the distance e between the image pickup portions unchanged, the viewer has trouble in viewing the captured stereoscopic image as a natural one. This case is an example of an arrangement to enable the viewer to view a stereoscopic image more easily by shortening the distance between the image pickup portions. In this way, when the distance e' between image pickup portions is adjusted in accordance with the distance from the subject being captured, it is possible for the viewer to view the stereoscopic image more comfortably. Illustratively, the distance e' may and should be determined so that the triangle with a base of a line having a length e' shown in FIG. 7B is kept similar to the triangle with a base of a line having a length e shown in FIG. 7A. In the present embodiment, since the distance between two image pickup portions is variable as shown in FIGS. 3B and 3C, it is possible to achieve a further flexible stereoscopic shooting by adjusting that distance. Further, recording or transmitting the adjusted result e' together with the captured image data makes it possible to view the image as a proper stereoscopic image in an display apparatus or edit it in an image editing apparatus other than the image shooting and display apparatus of the present embodiment.

Here the present embodiment is described by taking an example of an "image shooting and display apparatus", however the embodiment may be applied to an "image shooting apparatus" that does not include any display means and its associated control function. Also in this case, the simplicity and convenience for user operation and control relating to shooting as described with the aforementioned "image shooting and display apparatus" can be obtained.

The Description of the Second Embodiment

Next, the second embodiment of the present invention will be described with reference to FIGS. 1 and 4. FIG. 1 is a block diagram showing the internal configuration of an image shooting and display apparatus according to the first embodiment of the present invention, however the image shooting and display apparatus of the second embodiment is identical in internal structure to this. Since the description relating to FIG. 1 has been already made, the description herein is omitted. Since the basic internal operations for implementing normal shooting, stereoscopic shooting, panorama shooting and plural scene shooting and the like are the same as those in the aforementioned first embodiment, the detailed description is also omitted.

Figure 4A:
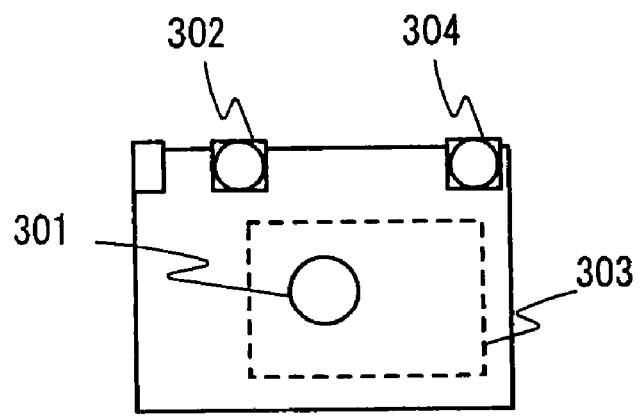
FIGS. 4A and 4B are schematic external views showing image shooting and display apparatus according to the second embodiment of the present invention.
Figure 4B:
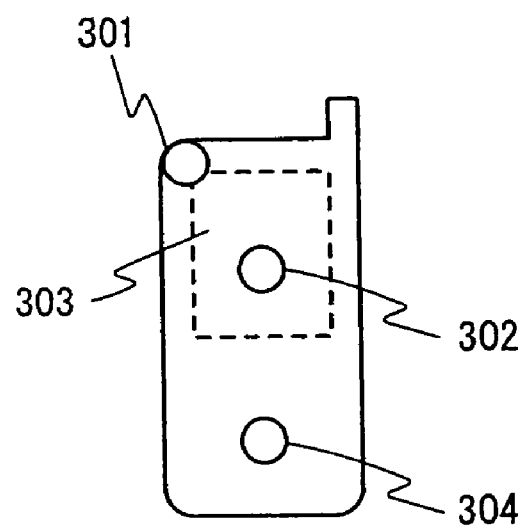

The main difference of the second embodiment from the first embodiment resides in the manner of usage and arrangement of a plurality of image pickup portions. FIG. 4A and 4B are schematic external views showing image shooting and display apparatus of this embodiment. FIGS. 4A and 4B show image shooting and display apparatus having three image pickup portions, where a main image pickup portion 301, a first auxiliary image pickup portion 302, a display portion 303 and a second auxiliary image pickup portion 304 are provided. FIGS. 4A and 4B are front views as viewed from the side of the subject to be shot. That is, these apparatus have the image pickup portions 301, 302 and 304 arranged on the front side and display portion 303 on the rear side. FIG. 4A shows an example of a laterally long image shooting and display apparatus, found as a typical digital camera or the like. FIG. 4B shows an example of a vertically long image shooting and display apparatus, found as a typical cellular phone or the like. Either configuration of FIG. 4A or FIG. 4B includes two auxiliary image pickup portions 302 and 304 other than main image pickup portion 301, and the two auxiliary image pickup portions are arranged a predetermined distance apart from each other. The predetermined distance is a distance suitable for stereoscopic shooting, i.e., approximately the distance between human eyes. Further, in order to enable panorama shooting and plural scene shooting, at least one of the image pickup portions has an adjustable structure of the direction of shooting, so that the plurality of image pickup portions are able to shoot not only an identical subject but also shoot continuous scenes and different subjects from each other.

The arrangement of image pickup portions in FIG. 4B is an example where the apparatus has a vertical long configuration and cannot take the predetermined distance in the horizontal direction. In FIG. 4B, two auxiliary image pickup portions 302 and 304 are disposed above and below each other and the predetermined distance apart. It is also possible to provide a configuration shown in FIG. 3C, where at least one auxiliary image pickup portion is movable so as to create a distance from the other auxiliary image pickup portion as required. In that case, the plurality of auxiliary image pickup portions need not be necessarily arranged in the vertical direction.

In the image shooting and display apparatus of the present embodiment, one of the three image pickup portions, namely, main image pickup portion 301 and auxiliary image pickup portions 302 and 304 is used for shooting normal still pictures and normal moving pictures, whereas two auxiliary image pickup portions 302 and 304 are used for stereoscopic shooting and panorama shooting. For plural scene shooting, the two auxiliary image pickup portions 302 and 304 alone or all the main image pickup portions, portion 301 and the two image pickup portions 302 and 304 may be used. Main image pickup portion 301 may have a higher capturing capability, i.e., higher resolution, compared to auxiliary image pickup portions 302 and 304. In this case, main image pickup portion 301 is used for normal shooting of still pictures, whereas the first auxiliary image pickup portion 302 is used for normal shooting of moving pictures. With this configuration, it is possible to shoot a high-resolution still picture and reduce the load on the filtering process and the like during the shooting of motion pictures. It is also possible to minimize the load on the correcting process to be implemented during panorama shooting and plural scene shooting.

Differentiation in resolution between main image pickup portion 301 and auxiliary image pickup portions 302 and 304 makes it possible to realize the aforementioned functions while inhibiting cost increase due to increase in number of parts of image pickup portions. It is also possible to use main image pickup portion 301 during normal shooting of moving pictures. In this case, actuation of only the main image pickup portion at all times when normal shooting is made, regardless of capture of still pictures or moving pictures is sufficient, so that user operation and control can be simplified.

Whether main image pickup portion 301 is used or not during plural scene shooting may be determined in accordance with the degrees of importance of subjects, such that if there is a particular subject to view among a plurality of subjects, the main image pickup portion 301 may be used for that subject and if otherwise, only the auxiliary image pickup portions 302 and 304 may be used for shooting.

Here, the present embodiment is also described by taking an example of an "image shooting and display apparatus" as in the first embodiment, however the embodiment may be applied to an "image shooting apparatus" that does not include any display means and its associated control function. Also in this case, the simplicity and convenience for user operation and control relating to shooting as described with the aforementioned "image shooting and display apparatus" can be obtained in the same manner as in the first embodiment.

The Description of the Third Embodiment

Next, the third embodiment of the present invention will be described with reference to FIGS. 5 and 6 and FIG. 2.

Figure 5:
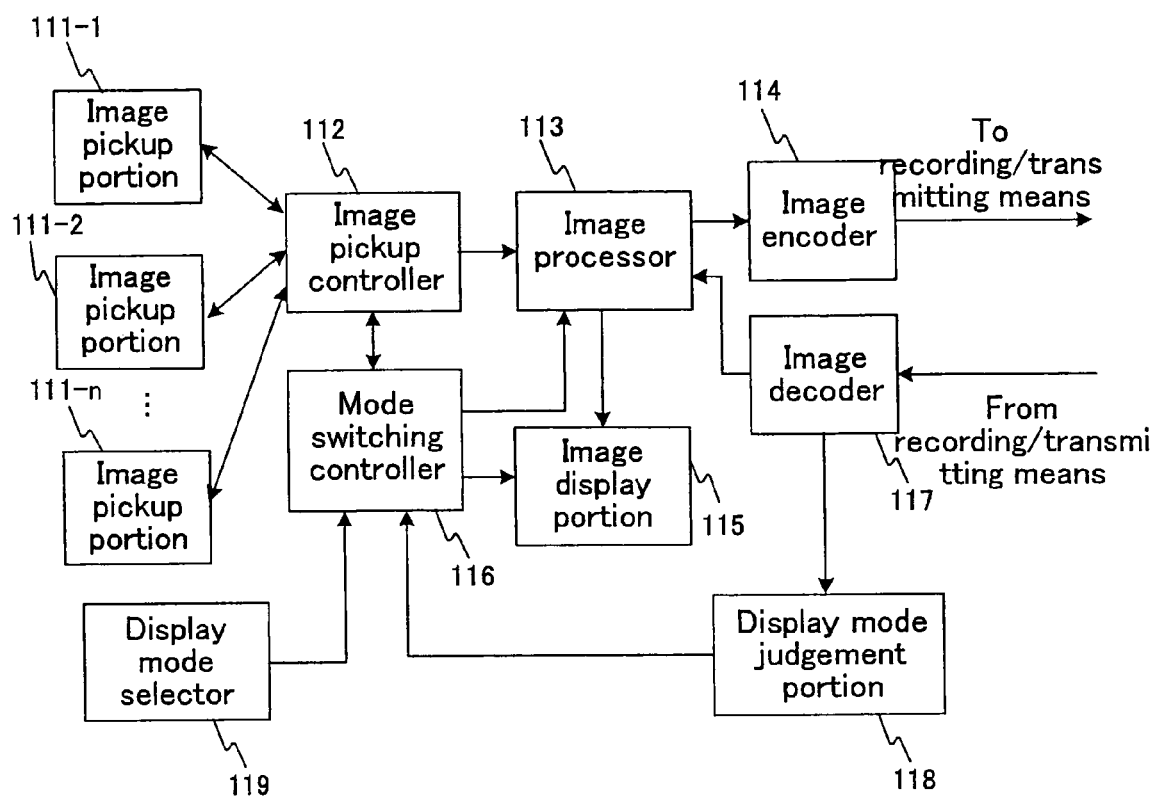
FIG. 5 is a block diagram showing the internal configuration of an image shooting and display apparatus according to the third embodiment of the present invention.

FIG. 5 is a block diagram showing the internal configuration of an image shooting and display apparatus according to the third embodiment of the present invention.

As shown in FIG. 5, the image shooting and display apparatus of the present invention includes: a plurality of image pickup portions 111-1 to 111-n; an image pickup controller 112; an image processor 113; an image encoder 114; image display portion 115; a mode switching controller 116; an image decoder 117; a display mode judgement portion 118; and a display mode selector 119. The main configuration difference from the first image shooting and display apparatus resides the inclusion of image decoder 117, display mode judgement portion 118 and display mode selector 119, so the difference of the operation relating to these additional elements will mainly be described hereinbelow.

Image decoder 117 decodes the coded image information from an unillustrated recording/transmitting means, to output the decoded image data and ancillary data representing the image data format. The image data is output to image processor 113 and the ancillary data is output to display mode judgement portion 118. This ancillary data may include the image size, information indicating whether the image data is for a normal image or for a stereoscopic image, etc., and information for a stereoscopic image if that data is for the stereoscopic image, indicating the number of viewpoints, the distance between viewpoints, the distance to the subject, and the like. Display mode judgement portion 118 decides, based on the ancillary data, the display mode suitable for the image data, and outputs the image identification information needed to display that image to mode switching controller 116. Display mode selector 119 determines the mode of image display in accordance with the image identification information, and the usage condition of the apparatus or the user's instructions, and gives notice to the mode switching controller 116. Mode switching controller 116, in accordance with the notice from the image pickup controller 112, the display mode judgement portion 118 and the display mode selector 119, determines the image shooting mode from normal shooting, stereoscopic shooting, panorama shooting, plural scene shooting and the like and also determines the display mode and gives notice of the result to image pickup controller 112, image processor 113 and image display portion 115. Image processor 113 implements correcting and compositing processes of the image data from the image decoder 117, in the same manner as that is done for the image data obtained from image pickup portions 111-1 to 111-n.

Next, judgement and selection of display mode during image shooting will be described in detail.

For display of the image data taken by an individual apparatus, the display mode is basically determined by mode switching controller 116 in accordance with the status of the image pickup portions. However, display mode selector 119 may be used to select another display mode differing from the determined display mode. In this case, the image is displayed in accordance with the display mode selected by display mode selector 119. That is, the apparatus is able to display in a display mode different from that in which the image was captured. For example, a user who is not used to view stereoscopic representation, is able to select normal display mode even if the image is shot in stereoscopic mode. In sum, the display mode can be selected in accordance with the user's request. Similarly, the display mode of the image data decoded by image decoder 117 is basically determined in accordance with the ancillary data that indicates the format of the image data, however, it is also possible to select another display mode differing from the indicated mode, by display mode selector 119. In this case, the image is displayed in accordance with the display mode selected by display mode selector 119.

Display mode selector 119 further has a function of judging the usage condition of the apparatus and determining the direction of the image to be displayed in accordance with the judgement. In order to judge the usage condition of the apparatus, the display mode selector may and should have a means such as a gravity sensor that detects the spatial top-and-bottom relationship.

With this feature, it is possible to judge whether the apparatus is used in the vertical position or in the horizontal position, that is, the direction of image display portion 115. For example, if a vertically long apparatus is used while being laid down, the image display portion is also rotated 90 degrees or set laid down. Accordingly, if no measure was taken, an image that had been displayed properly in the vertical position would not be able to be viewed correctly because the image would also be laid down. However, in the present configuration, since the usage condition of the apparatus is detected by the display mode selector and the display image is rotated 90 degrees, the user is able to view the image in the correction position. It is of course possible as stated above that the apparatus can determine the direction of display without regard to the usage condition of the apparatus if the user designates so.

Image display portion 115 includes a display device capable of displaying stereoscopic images. In a display device of this kind, usually the usage position for displaying stereoscopic images is previously determined. For example, the position in which the user can view stereoscopic images properly is either the vertical position or lateral position only. Display mode selector 119 also determines whether stereoscopic display mode should be selected in either the vertical usage position or lateral usage position, in accordance with the property of the image display portion. For example, in a display device capable of displaying stereoscopic images when it is set at a lateral position, if the image shooting and display apparatus has the image pickup portions arranged so as to be able to shoot stereoscopic images when the display device is set laterally, the apparatus may and should be automatically switched into stereoscopic display mode when a stereoscopic image is to be shot. On the other hand, in a display device capable of displaying stereoscopic images when it is set at a lateral position, if the image shooting and display apparatus has the image pickup portions arranged so as to be able to shoot stereoscopic images when the display device is set vertically, the apparatus should be set into normal display mode even when a stereoscopic image is to be shot.

If the display device of image display portion 115 has the function of displaying stereoscopic images in either the vertical position or the lateral position, the display mode maybe determined simply in accordance with the usage condition of the apparatus.

Next, the arrangement of the image pickup portions and display control in the image shooting and display apparatus of this embodiment will be described.

Figure 6A:
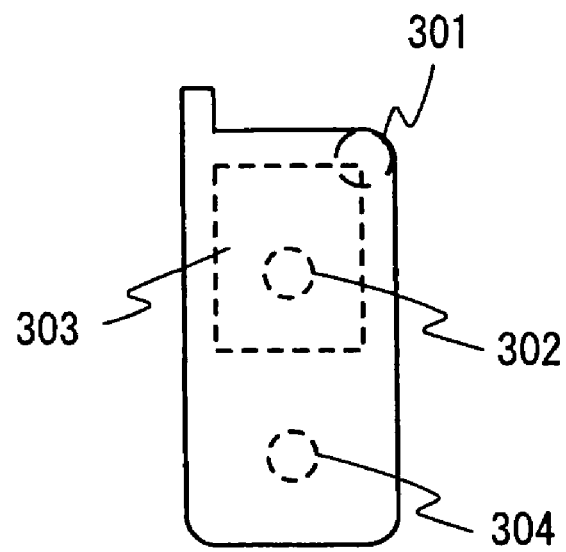
FIGS. 6A and 6B are conceptual views showing usage conditions of an image shooting and display apparatus according to the third embodiment of the present invention.
Figure 6B:
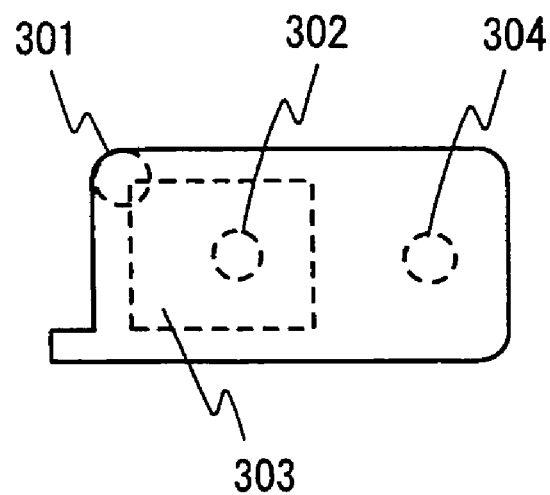

FIGS. 6A and 6B are schematic external views showing usage conditions during shooting or during display of an image shooting and display apparatus according to the third embodiment of the present invention. FIGS. 6A and 6B show an example of an image shooting and display apparatus having a vertically long configuration with three image pickup portions, where a main image pickup portion 301, a first auxiliary image pickup portion 302, a display portion 303 and a second auxiliary image pickup portion 304 are provided. The appearance of this image shooting and display apparatus and the arrangement of image pickup portions and a display are the same as those shown in FIG. 4B, but FIGS. 6A and 6B, contrary to FIG. 4B, show the front view as viewed from the user who is shooting, where the display portion is arranged on the near side and the image pickup portions are arranged on the far side.

FIG. 6A shows a usual usage position of the image shooting and display apparatus. The apparatus is used in this position when normal image shooting is implemented or when the recorded image data or image data received from the outside is displayed. During normal image shooting, only main image pickup portion 301 is actuated and the image being captured is displayed on display portion 303. Recorded images or images received from the outside are also displayed in the same manner on display portion 303. As to the display mode of the display portion, if a recorded image or externally received image is a stereoscopic one, the image is displayed in stereoscopic display mode; otherwise, the image is displayed in normal display mode.

If an image to be displayed is too large in size to be displayed on the display portion, mode switching controller 116 (FIG. 5) may reduce the whole image in size so that it can fit to the display area of display portion 303. It is also possible to provide such a configuration that, based on the user's instructions, mode switching controller 116 can move part of the image to be displayed by so-called "scrolling" so as to allow the user to view the whole image.

When the image shooting and display apparatus is used in stereoscopic shooting mode, panorama shooting mode or plural scene shooting mode, the apparatus is held in a usage position as shown in FIG. 6B.

In stereoscopic shooting, two auxiliary image pickup portions 302 and 304 are actuated while the image being shot is displayed on display portion 303. At this time, display portion 303 is operated in stereoscopic display mode so as to display a stereoscopic image constituted of two images obtained from the two auxiliary image pickup portions 302 and 304.

In panorama shooting, similarly to the above, two auxiliary image pickup portions are actuated while the image being shot is displayed on display portion 303. At this time, display portion 303 is operated in normal display mode and displays a panorama image as shown in FIG. 2B by compositing two images obtained from the two auxiliary image pickup portions 302 and 304. In displaying a panorama image, the whole image may be reduced in size so that it fits into the display area of display portion 303, or may be displayed by scrolling.

In plural scene shooting, similarly to the above, two or more among two auxiliary image pickup portions 301, 302 and 304 are actuated while the image being shot is displayed on display portion 303. At this time, display portion 303 is operated in normal display mode. In displaying plural scene images, the images obtained from the plurality of image pickup portions may be joined and displayed as a plural scene image as shown in FIG. 2C. Alternatively, one image obtained from a particular image pickup portion is mainly displayed while the images obtained from the other image pickup portions may be displayed on sub-windows. As another method, it is also possible to switch the images obtained from all image pickup portions by turns at regular intervals or by the user's operation.

With regard to image shooting modes other than the stereoscopic shooting mode, if the shooting mode and display mode may be controlled so as to deal with either usage position shown in FIG. 6A or FIG. 6B in accordance with the object to be shot, it is possible to improve flexibility in using the apparatus.

Description of the image shooting and display apparatus of the present invention up to this point has been made referring to the display operation with shooting being done. Next, the operation for displaying recorded image data or image data externally received will be described.

When recorded image data or image data externally received is displayed, in the image shooting and display apparatus of the present invention, basically, mode switching controller 116 determines the display mode following the image identification information output from display mode judgement portion 118, in accordance with the ancillary data that indicates the image data format, as stated already.

Alternatively, it is also possible to display the image in the display mode that is determined by display mode selector 119 in accordance with the user's operation or the usage condition of the apparatus. The control method in this case will be described hereinbelow.

Firstly, the display mode may be determined in accordance with the ancillary data that indicates the image data format. For example, when laterally long stereoscopic image data is displayed, even if the user uses the image shooting and display apparatus of this embodiment in the position as shown in FIG. 6A the image is rotated 90 degrees or to the laid-down position. Accordingly, the user needs to shift the apparatus into the position as shown in FIG. 6B in order to view the displayed image properly. Secondly, the display mode may be determined in accordance with the current position of the image shooting and display apparatus. That is, if the user wants to give priority to the position in which the user is using the apparatus regardless of the image data format, the user is able to indicate the intention through the display mode selector. For example, even in the above case, without any image rotation to the lateral position the user is able to view the image properly in the position as shown in FIG. 6A. Thirdly, the display mode may be determined in accordance with the user's arbitrary designation. If the user, for example, after the display mode has been determined based on the above second rule, lies down and goes on viewing the display, it is inconvenient if the position of the image is changed in accordance with the above second rule. To deal with such a situation, the user is able to give instructions through display mode selector as above, and the image will not rotate to the lateral position even in the case of the above example and the user is able to view the image properly while lying down holding the apparatus in the position as shown in FIG. 6B.

Here the present embodiment is described by taking an example of an "image shooting and display apparatus", however the embodiment may be applied to a "display apparatus" that does not include any shooting means and its associated control function. Also in this case, the simplicity and convenience for user operation and control relating to image display as described with the aforementioned "image shooting and display apparatus" can be obtained.

Conversely, the embodiment may be applied to an "image shooting apparatus" that does not include any display means and its associated control function. Alternatively, a configuration that has a display means but does not display the image during shooting is also possible. Also in this case, the simplicity and convenience for user operation and control relating to image shooting as described with the aforementioned "image shooting and display apparatus" can be obtained similarly. Further, though the present embodiment has been described referring to an example where three image pickup portions are provided, it is possible to construct an image shooting and display apparatus or image shooting apparatus having four or more image pickup portions, as an extension of the same idea.

What is claimed is:

1. An image shooting apparatus, comprising:
   a plurality of image pickup means which can be controlled to be individually active or inactive;
   an image pickup control means for controlling the plurality of image pickup means; and
   a mode switching control means for performing switching control between a plurality of image shooting modes in accordance with an operating status of the image pickup means where the mode switching control means acquires the operating status of each of the image pickup means from the image pickup control means and determines one of the plurality of image shooting modes to perform switching control between,
   wherein the mode switching control means switches the image shooting mode of the apparatus into stereoscopic shooting mode based on the operating status,
   wherein the operating status can be determined to be a stereoscopic shooting mode when among the plurality of image pickup means, at least two image pickup means, arranged a predetermined distance apart from each other, or set a predetermined distance apart from each other by shifting at least one of the plurality of image pickup means, are actuated in such a state that optical axes of the image pickup means lie on the same plane and the optical axes are parallel to each other or intersect each other at a point on that plane forwards with respect to these image pickup means, and
   wherein among the plurality of image pickup means, at least one image pickup means is variable in distance from the other image pickup means.

2. The image shooting apparatus according to claim 1, wherein the mode switching control means sets the shooting mode of the apparatus into a normal shooting mode when, among the plurality of image pickup means, only a single image pickup means is operated for image shooting.

3. The image shooting apparatus according to claim 1, wherein the mode switching control means switches the image shooting mode of the apparatus into panorama shooting mode when among the plurality of image pickup means, at least two image pickup means are actuated in such a state that optical axes of the image pickup means lie on the same plane and the optical axes intersect each other at a point on that plane rearwards with respect to these image pickup means.

4. The image shooting apparatus according to claim 1, wherein the mode switching control means switches the image shooting mode of the apparatus into plural scene shooting mode when among the plurality of image pickup means, at least two image pickup means are actuated in such a state that optical axes of the image pickup means do not exist within the same plane.

5. The image shooting apparatus according to claim 1, further comprising:
   an image processing means for subjecting to captured data of images from the plurality of image pickup means to a correcting process for correcting a difference of a characteristic between the image pickup means.

6. The image shooting apparatus according to claim 1, wherein among the plurality of image pickup means, at least two image pickup means are arranged a predetermined distance apart from each other along a longitudinal direction of the image shooting apparatus.

7. An image shooting apparatus, comprising:
   a plurality of image pickup portions which can be controlled to be individually active or inactive;
   an image pickup controller for controlling the plurality of image pickup portions; and
   a mode switching controller for performing switching control between a plurality of image shooting modes in accordance with an operating status of the image pickup portions where the mode switching controller acquires the operating status of each of the image pickup portions from the image pickup controller and determines one of the plurality of image shooting modes to perform switching control between,
   wherein the mode switching controller switches the image shooting mode of the apparatus into stereoscopic shooting mode based on the operating status,
   wherein the operating status can be determined to be a stereoscopic shooting mode when among the plurality of image pickup portions, at least two image pickup portions, arranged a predetermined distance apart from each other, or set a predetermined distance apart from each other by shifting at least one of the plurality of image pickup portions, are actuated in such a state that optical axes of the image pickup portions lie on the same plane and the optical axes are parallel to each other or intersect each other at a point on that plane forwards with respect to these image pickup portions, and
   wherein among the plurality of image pickup portions, at least one image pickup portion is variable in distance from the other image pickup portions.

8. The image shooting apparatus according to claim 7, wherein the mode switching controller sets the shooting mode of the apparatus into a normal shooting mode when, among the plurality of image pickup portions, only a single image pickup portion is operated for image shooting.

9. The image shooting apparatus according to claim 7, wherein the mode switching controller switches the image shooting mode of the apparatus into panorama shooting mode when among the plurality of image pickup portions, at least two image pickup portions are actuated in such a state that optical axes of the image pickup portions lie on the same plane and the optical axes intersect each other at a point on that plane rearwards with respect to these image pickup portions.

10. The image shooting apparatus according to claim 7, wherein the mode switching controller switches the image shooting mode of the apparatus into plural scene shooting mode when among the plurality of image pickup portions, at least two image pickup portions are actuated in such a state that optical axes of the image pickup portions do not exist within the same plane.

11. The image shooting apparatus according to claim 7, further comprising:

an image processor for subjecting to captured data of images from the plurality of image pickup portions to a correcting process for correcting the difference of a characteristic between the image pickup portions.

12. The image shooting apparatus according to claim 7, wherein among the plurality of image pickup portions, at least two image pickup portions are arranged a predetermined distance apart from each other along a longitudinal direction of the image shooting apparatus.

* * * * *

UNITED STATES PATENT AND TRADEMARK OFFICE
CERTIFICATE OF CORRECTION

PATENT NO. : 7,599,616 B2  Page 1 of 1
APPLICATION NO. : 11/239258
DATED : October 6, 2009
INVENTOR(S) : Uchiumi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this

Twenty-eighth Day of September, 2010

David J. Kappos
*Director of the United States Patent and Trademark Office*